Figure 1:
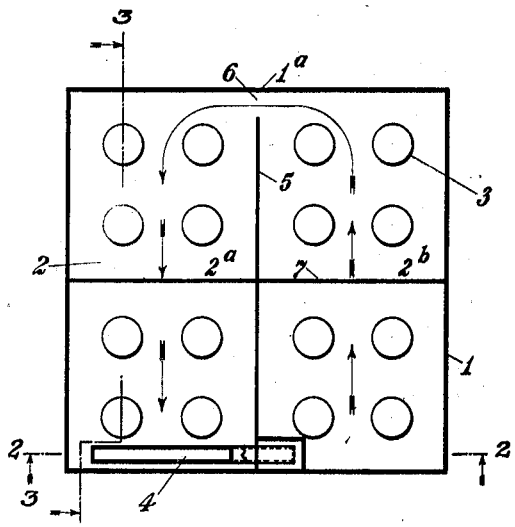

Oct. 23, 1928.

T. BAKER ET AL 1,688,515

PLATE COLUMN

Filed Aug. 19, 1924

T. Baker  Inventors
and W. A. Peters, Jr.
By their attorney

Patented Oct. 23, 1928.

1,688,515

UNITED STATES PATENT OFFICE.

THEODORE BAKER, OF POMPTON PLAINS, NEW JERSEY, AND WILLIAM A. PETERS, JR., OF WILMINGTON, DELAWARE, ASSIGNORS TO E. I. DU PONT DE NEMOURS & COMPANY, OF WILMINGTON, DELAWARE, A CORPORATION OF DELAWARE.

PLATE COLUMN.

Application filed August 19, 1924. Serial No. 733,012.

This invention relates to plate columns, the invention being here described with more particular reference to plate columns of the bubbler-cap type.

As is well-known, the separating efficiency of the usual fractionating column of the sieve-plate or bubbler-cap-plate type is considerably below that theoretically obtainable. There are various reasons for this inefficiency, one of them being that the passage of vapor and liquid is not strictly counter-current, that is to say, the vapor in passing up the column from plate to plate does not come into contact at each plate inturn with liquor that varies uniformly in composition from plate to plate. In the usual type of column, as is well known, the liquid passes down from plate to plate through down pipes, while the vapors pass upwardly through outlet apertures in the plates, the arrangement being such that a proper level of liquid on the vapor outlets of each plate is maintained. The down pipes are so located that, in passing downwardly through the column from plate to plate, the liquid flows across the plates, reversing its direction of flow on each succeeding plate. For example, considering the first or topmost plate of a column, the refluxing liquid may be assumed to be introduced on the right hand-side of the plate as viewed by an observer. This liquid then flows across the plate to a down pipe located at the left-hand side of the plate, through which it passes down to the second plate, or the plate next below. The liquid now flows from the left-hand side of the second plate across this plate to the right-hand side thereof and then passes down another down pipe from the second plate to the third plate, and so on. Vapors, on the other hand, pass substantially vertically from plate to plate through the outlet apertures which are distributed fairly uniformly over each plate. Accordingly, vapors on the right-hand side pass through liquid on the second plate which has traveled across two plates (i. e. the first and second) in coming from the point where the corresponding vapor passes through the liquid on the first or top plate. On the left-hand side, the vapor passes through liquid on the second plate which has merely descended from the first plate through the down pipe on that side. In other words, considering the first and second plates, the liquid and vapor are two plates out of phase on the right-hand side of the column, while on the opposite or left-hand side, the vapor passes through the same liquid twice in succession. A similar condition prevails in the case of any other pair of immediately adjacent or succeeding plates in the column. Thus it is that in passing upwardly through the column, the vapors do not pass through layers of liquor that vary uniformly in composition from plate to plate. This causes inefficiency since the liquid on one side of each plate has a rectifying efficacy no different from that of the liquid on the same side of an immediately adjacent plate, say the plate next below; while a double burden is imposed on the liquid on the same side of the plate next above. Similar conditions obtain substantially throughout the column.

It is a major object of the present invention to overcome the difficulty hereinabove mentioned and to provide a fractionating column enabling a nearer approach to strictly counter-current contacting of liquid and vapors and possessing other important advantages over plate columns heretofore known. With this and other objects in view, the invention consists in the novel combination and arrangement of parts which will be first described hereinafter in connection with a typical practical embodiment and which will then be more particularly pointed out in the appended claims.

Generally described, the plate column of the present invention is so constructed that the liquor at any bubbler or other vapor outlet varies by a uniform plate distance, as by one plate circuit for example, from the liquor at the similarly positioned or corresponding bubbler on the plate immediately below or above. By this arrangement, vapors in passing vertically upward through the column contact at each plate with liquor that varies uniformly in composition from plate to plate.

Without restricting the invention thereto is it described with more particular reference to the column embodying it illustrated in the accompanying drawings. These drawings are simplified, conventional, and somewhat diagrammatic, in character, the more clearly to indicate the invention, no attempt being made to illustrate details of construction having no particular relation to the invention, since the general methods of constructing, assembling and operating fractionating columns are of course well-known to those skilled in the art.

Figure 2:
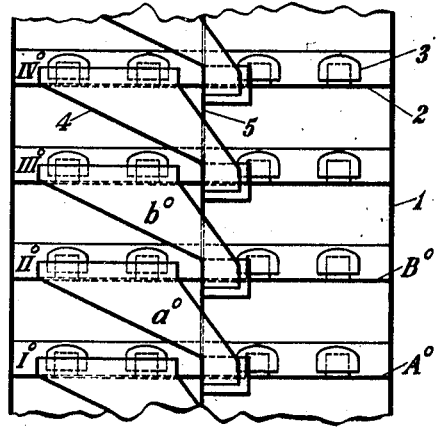
Figure 3:
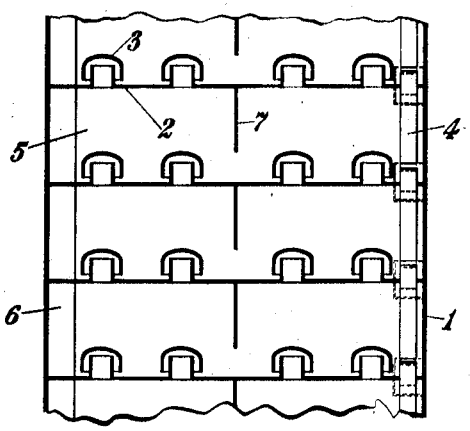

In the drawings, Fig. 1 is a horizontal cross-section through a column embodying the present invention, one of the plates being shown in plan; and Figs. 2 and 3 are vertical sections taken substantially on the lines 2—2 and 3—3 of Fig. 1, and are fragmentary in character, showing an intermediate portion of the length of the illustrated column. It will be understood that columns embodying the invention are preferably constructed throughout their lengths in accordance with the principles exemplified by the portions illustrated, and they are, of course, provided with suitable connections for supplying and withdrawing vapor, and so on, as is usual in such columns.

Referring to the drawings, the column here illustrated has a casing 1 within which, as is customary, are arranged a series of plates 2, carrying bubblers 3 and provided with down pipes 4. In accordance with the invention the column is divided vertically by a plurality of dividing means, one for each plate, each being in the form of a partition 5, which contacts at one edge with one of the walls of the casing and extends across its plate toward but not entirely to the other wall 1ᵃ of the casing, thus dividing each plate into two portions 2ᵃ and 2ᵇ while leaving a passage 6 from one portion to the other. The dividing means compels the liquor to flow on each plate, in a circuit around the central vertical axis of the column in a generally orbital manner, from the inlet end of the circuit, which is in proximity to the junction of the dividing means or partition with the wall of the casing, to the outlet end of the circuit which is also in proximity to said junction, the inlet end and the outlet end of a liquor circuit being on opposite sides of the dividing means as will be clear from Fig. 1. It is to be noted further that all the inlet ends of the liquor circuits for the respective plates are on the same sides of their respective dividing means, as will be seen from Fig. 2. It follows, of course, that the outlet ends are all on the sides of their respective dividing means opposite to the corresponding inlet ends. In further accordance with the invention, the down pipes 4 are in substantial vertical alignment and each extends from a portion 2ᵃ of one plate through the partition 5 to the portion 2ᵇ of the plate next below. Thus the liquor is conducted from the outlet end of the liquor circuit on one plate to the inlet end of the liquor circuit of the next plate beneath, so that the direction of flow of the liquor in all the circuits is the same. In the present example, the liquor flow for all the plates is counterclockwise, as indicated by the arrows in Fig. 1. With this arrangement, the liquor at any given point on a plate is one, and but one,-plate circuit different in plate travel, and substantially in composition, from the liquor at the point in vertical alignment with the given point on the next plate below or above, and this condition obtains for each plate. To illustrate, by reference to Figure 2, the liquor at position I° has been received from position II° through the down pipe $a°$ and, because of the down pipe $a°$ extending through the partition 5 and discharging on the opposite side thereof from the position I°, has travelled one plate circuit on plate A° to position I°, so that the liquor at position II° is, in travel, one plate circuit behind the liquor at position I°, and similarly the liquor at position II° has been received from position III° through the down pipe $b°$ and, because of the down pipe $b°$ extending through the partition 5 and discharging on the opposite side thereof from the position II°, has travelled one plate circuit on plate B° to position II°, so that the liquor at position III° is, in travel, one plate circuit behind the liquor at position II°, and so on. Evidently vapor passing vertically through the column meets, at each bubbler, liquor which is always one, and never but one, plate circuit different in composition from the liquor at the immediately preceding bubbler. Thus the column gives the desired effect of a counter-current travel which is uniform throughout the length of the column, the vapors and liquor which are in contact on a plate always bearing the same relation to each other, i. e., always differing from each other by substantially one plate travel.

Desirably the column is provided with cross baffle plates 7 in any suitable number, but one being illustrated for simplicity, for preventing vapor from one part of a plate from mixing with that from another part of the plate. This ensures that vapor from a bubbler of one plate will pass to that point on the plate above where the liquor differs by one plate travel from the liquor it has just left. These baffles terminate, of course, somewhat above the plates immediately below them, thus not to interfere with the flow of liquor along the plates.

While the invention has been particularly described with reference to a bubbler-cap type column it will be understood that it is applicable to other columns of the plate type, as a sieve-plate column. Also, other arrangements for the travel of the liquor may be adopted; so that in referring to plate travel in the claims it will be understood that we do not restrict the invention to a column in which the liquor makes a circuit of the plate, rather than travelling across the plate, or in some other manner traversing the same. The major point is that whatever the path of the liquor or the length thereof on the plate the vapors and liquor in contact shall differ by substantially one unit of travel. While the invention is applicable to columns of various sizes, it finds particularly advantageous application in those of large diameter for in large-diameter columns the disadvantages of prior columns are especially noticeable and objectionable.

We claim:

1. In a plate column, a casing, a series of superposed liquor-collecting plates within the casing, each provided with vapor-liquor contact apertures, partition means dividing each of said plates to provide a liquor circuit along which the liquor flows from the inlet end of the circuit to the outlet end of the same circuit in an orbital manner around the central vertical axis of the column, the direction of travel in the circuit being always the same on each plate and the same for all the plates, and a series of down pipes from plate to plate, each down pipe connecting the outlet end of the liquor circuit of one plate with the inlet end of the liquor circuit on the plate next below.

2. In a plate column, a casing, a series of superposed liquor-collecting plates within the casing, each provided with vapor-liquor contact apertures, a dividing means for each plate, each contacting with one wall of the casing and arranged to provide a liquor passage near the opposite wall of the casing, whereby a liquor circuit is provided on each plate having its inlet end at one side of the dividing means in proximity to the place where the latter contacts with the wall of the casing and having its outlet end on the opposite side of the said dividing means also in proximity to the place where the dividing means contacts with the casing, the inlet ends of the liquor circuits of all the plates being on the same sides of their respective dividing means, and a series of down pipes from plate to plate, each down pipe connecting the outlet end of the liquor circuit of one plate with the inlet end of the liquor circuit of the plate next below.

3. In a plate column, a casing, a series of superposed bubbler plates, a series of partitions each of which divides one of the series of spaces formed between the successive bubbler plates into two portions which communicate with each other adjacent one end only of the partition separating them, and a series of down pipes from plate to plate, each down pipe extending from a liquor outlet point on one plate at one side of the partition on that plate through the partition on the plate next below to a liquor inlet point thereon.

4. In a plate column, the construction defined in claim 3, further characterized by the fact that the said partitions extend through the central vertical axis of the column and are substantially in vertical alinement.

5. In a plate column, in combination, a series of plates for the collection of liquor each having a plurality of vapor passages therein, the plates being arranged in vertically-spaced relation with their vapor passages in substantial alignment, partition means dividing the plates each into sections and providing on each plate a passage between the sections of such plate adjacent a wall of the column thereby to provide a circuit for liquor, and down pipes from plate to plate arranged in substantial vertical alignment and each passing through said partition means to connect one section of one plate to the other section of the plate below.

6. In a plate column, in combination, a series of plates for the collection of liquor each having a plurality of vapor passages therein, the plates being arranged in vertically-spaced relation with their vapor passages in substantial alignment, partition means dividing the plates each into sections and providing on each plate a passage between the sections of such plate adjacent to wall of the column thereby to provide a circuit for liquor, down pipes from plate to plate arranged in substantial vertical alignment and each passing through said partition means to connect one section of one plate to the other section of the plate below, and baffle means for separating from each other the vapor streams issuing from the vapor passages of the plates.

In testimony whereof we affix our signatures.

THEODORE BAKER.
WILLIAM A. PETERS, Jr.